May 7, 1935.  R. D. SMITH  2,000,866
CHASSIS CHECKING GAUGE
Filed April 16, 1934  3 Sheets-Sheet 1

ROY D. SMITH INVENTOR.
BY Merrill M. Blackburn
ATTORNEY

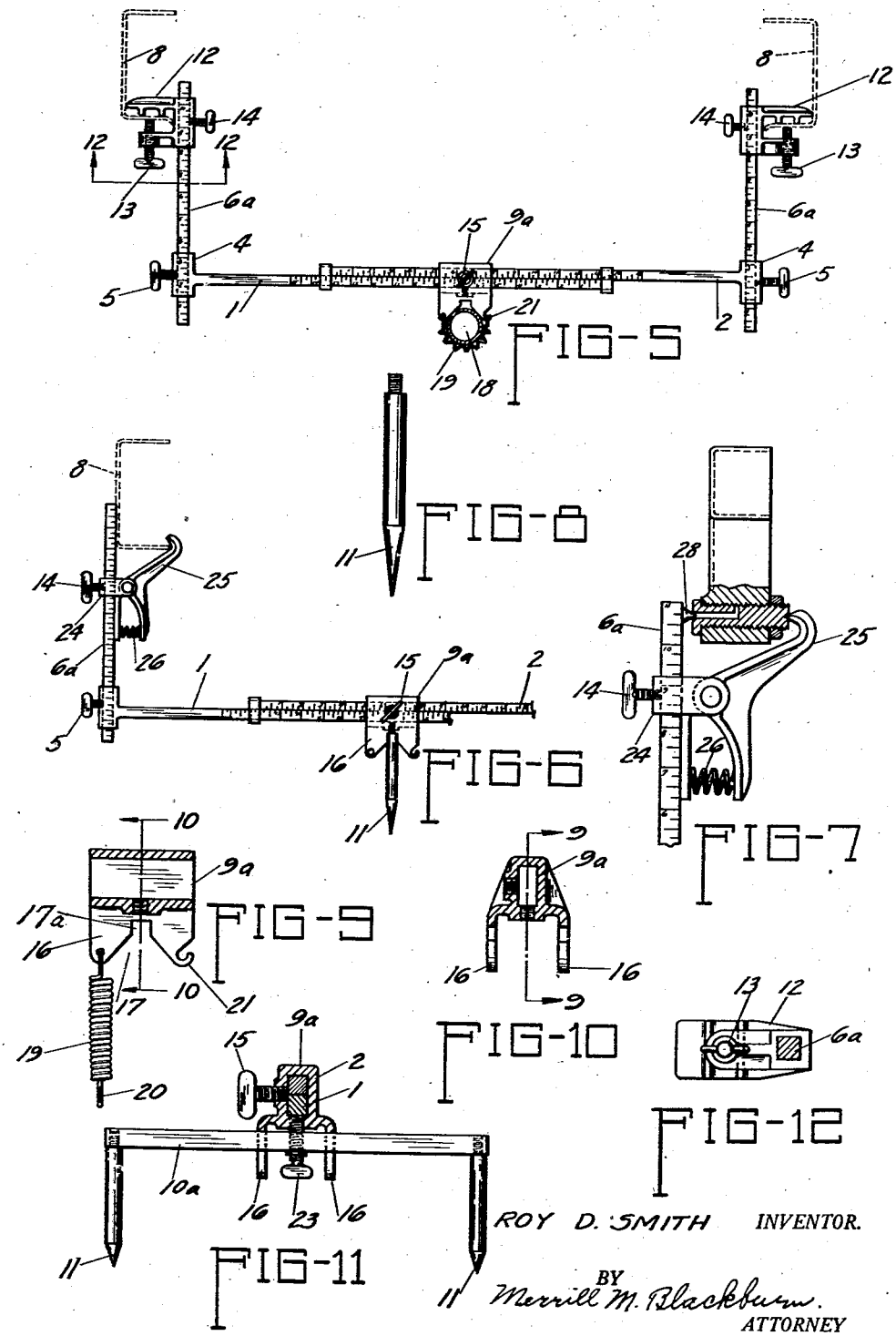

May 7, 1935.　　　　R. D. SMITH　　　　2,000,866
CHASSIS CHECKING GAUGE
Filed April 16, 1934　　　3 Sheets-Sheet 3

ROY. D. SMITH　INVENTOR.
BY
Merrill M. Blackburn
ATTORNEY

Patented May 7, 1935

2,000,866

UNITED STATES PATENT OFFICE 2,000,866

CHASSIS CHECKING GAUGE

Roy D. Smith, Davenport, Iowa, assignor to Bee Line Manufacturing Company, Davenport, Iowa, a corporation of Iowa Application April 16, 1934, Serial No. 720,741

10 Claims. (Cl. 33—191)

The present invention relates to means for checking the various parts of the chassis of a motor vehicle, both as to toe-in of the wheels and as to rectitude of the frame. Among the objects of this invention are to provide improved means for frame checking; to provide improved means for checking toe-in; to provide accurate means for checking frame alignment; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 5 is an elevation of another embodiment of this invention;

Fig. 6 is a fragmentary elevation of a still further modification of this invention;

Fig. 7 is a fragmentary sectional elevation showing still another modification;

Fig. 8 is an elevation of one of the sighting elements;

Fig. 9 is a vertical section taken substantially along the plane indicated by the line 9—9, Fig. 10;

Fig. 10 is a section at a right angle to the plane of Fig. 9 and taken substantially along the plane indicated by the line 10—10 of that figure;

Fig. 11 is a view comparable to Fig. 10 but showing the clamp applied to the transverse bar and having gauge pointers mounted therein and carried thereby;

Fig. 12 is a transverse section taken approximately along the plane indicated by the line 12—12, Fig. 5, and in the plane indicated by the arrowheads;

Because of the change in construction and design of motor vehicles which renders obsolete much of the present equipment for checking the frames of such vehicles, it has been necessary to produce other equipment capable of use with the vehicles constructed according to the designs now accepted. Therefore, since it is practically impossible to get at the vehicle frames from the outside, I have proceeded to produce apparatus capable of utilization underneath the vehicle and between the side frame members.

Figure 1:
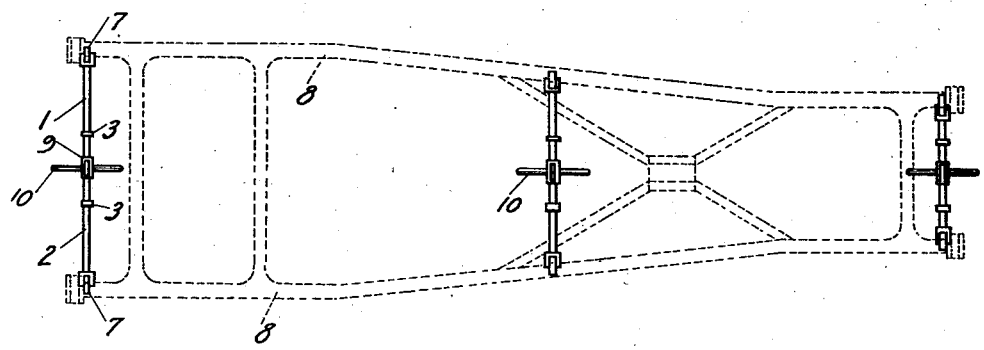
Fig. 1 is a plan view illustrating one mode of use of this invention.
Figure 2:
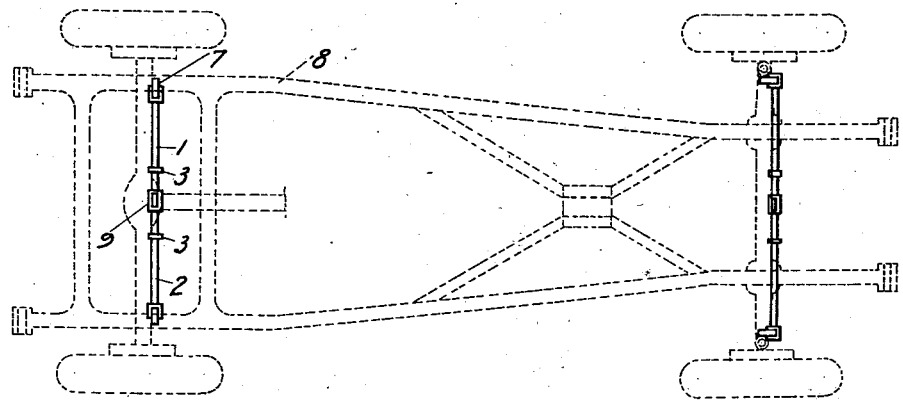
Fig. 2 is a plan view showing another mode of utilizing this invention in the checking of a motor vehicle.

Figure 1 shows the application of this apparatus at the two ends of the frame and intermediate the ends thereof, while Fig. 2 illustrates the use of this apparatus in connection with the vehicle axles. It will of course be understood that these two figures are largely diagrammatic and designed merely to illustrate the utilization of the mechanism.

Figure 3:
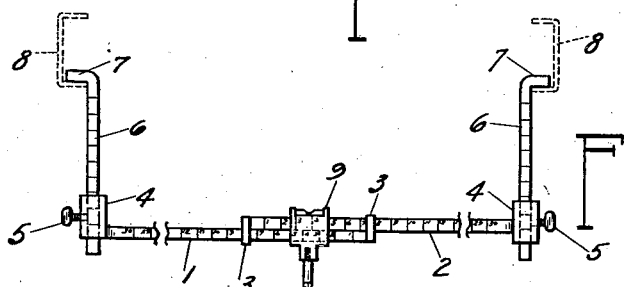
Fig. 3 is an elevation of one embodiment of this invention.

Various specific forms of construction are shown in the different figures but they are essentially the same, nevertheless. A pair of graduated cross-bars 1 and 2 having loops 3 at their inner ends for embracing, slidably, the bars to which they are not secured are provided at their outer ends with sleeves 4 which have set screws 5 therein whereby the graduated vertical bars 6 may be secured in properly adjusted position. As shown in Fig. 3, these vertical bars 6 may have their ends bent laterally, as indicated at 7, to engage the lower flanges of the side frame members 8 of the vehicle. By virtue of this construction, this gauge member can be suspended from the two frame members, the sleeves 4 being adjusted vertically on the bars 6 until the tops or bottoms of these sleeves may be read at the same point on the two bars. The sleeve 9 is slidably mounted on the cross bars 1 and 2 and may be moved longitudinally thereof until the readings at the two sides of the sleeve, upon the two bars, are identical. This is not exactly true of the illustration in Fig. 3 but is nearly so. The cross bar 10, carrying the pointers 11, may be formed integrally with the sleeve 9 or may be secured thereto. In order to be of value in checking the vehicle chassis, the line defined by the two pointers 11 must be at a right angle to that defined by the cross bars 1 and 2.

If one of these devices is placed at each of the two ends of a machine, as shown in Fig. 1, and the sleeves 9 are set at the middle thereof, as described above, and then a third gauge member is placed intermediate the ends of the frame, it can easily be determined by sighting along the points 11 whether the frame is straight and rectangular or not. Similarly, a pair of these units might be used adjacent the front and rear axles, as shown in Fig. 2. These can be used without the intermediate member for determining parallelism of the axles, and with the intermediate member in the same manner as in the arrangement shown in Fig. 1. From Fig. 3 it will be seen that the graduated bars 6 may be removed from the sleeves 4 and rotated ninety degrees (90°), to assume the positions shown at the right in Fig. 2.

Figure 4:
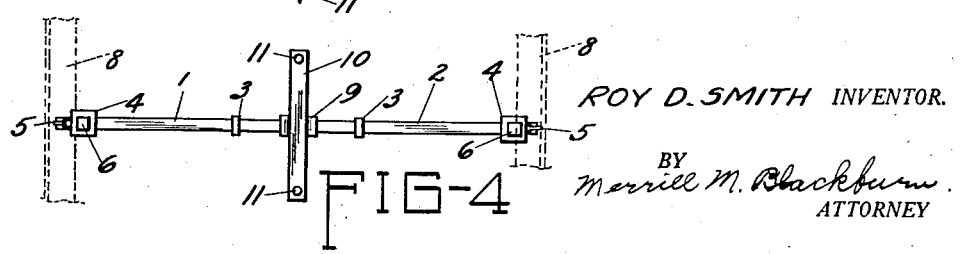
Fig. 4 is a bottom face view of the construction shown in Fig. 3.

The structure shown in Fig. 5 is similar to that shown in Figs. 3 and 4 but differs therefrom in certain respects which will now be described. The vertical bars 6 with bent ends 7 are replaced by straight bars 6a having frame clamping members 12 provided with thumb screws 13. The clamps 12 are secured to the bars 6a by means of thumb screws 14. By means of the thumb screws 5 and 14, the cross bar may be adjusted into parallelism with the plane of the frame, as indicated in connection with Fig. 3.

The sleeve 9 is replaced by a sleeve 9a which is adjustable along the bars 1 and 2, as in the previously described construction. A thumb screw 15 extends through a wall of the sleeve 9a and serves to clamp the sleeve and the cross bar together. Opposite parallel arms 16 depend from the sleeve 9a and have V-shaped notches cut or formed therein to receive a pipe 18, as shown in Fig. 5. These notches 17 tend to hold the pipe 18 at right angles to the cross bar, as will be evident. A spring or springs 19, secured at one side of a notch 17, may have a loop 20 at one end thereof engaged with a hook 21 to hold the pipe up in position. By placing one of these constructions at each end of a machine, as shown in Fig. 1, the center line of the machine may be established. Now, if an intermediate member is used, as in Fig. 1, the sleeve 9a being free to slide along the cross bar, the straightness or crookedness of the frame members 8 may be determined by taking the readings on opposite sides of the sleeve 9a of the middle unit. In this way, any point where the frame is out of true may be quickly and easily determined. It will of course be understood that when the pipe 18 is used, the aligning points 11 will be omitted. Also, the cross bar 10a, shown in Fig. 11, will be omitted at this time. This cross bar 10a has an opening formed centrally therethrough for the reception of a thumb screw 23 which clamps the bar in place in the rectangular notches 17a. The cross bar 10a and aligning points 11 have the same function as described above in connection with Figs. 3 and 4. If a single aligning point is desired, as illustrated in Fig. 6, the cross bar 10a may be omitted and the aligning point 11 inserted in the opening in sleeve 9a in place of the thumb screw 23. This use is clearly shown in Fig. 6.

In Fig. 6 there is shown means for holding the upright bars 6a against the outside of the frame member 8 which comprises a sleeve 24 having a pivoted holding member 25 actuated into clamping position by means of a spring 26. The purpose and function of this device will be clearly evident from Fig. 6. A similar device is shown in Fig. 7 which differs from Fig. 6 to the extent that a pointed member 28 is screwed or otherwise fastened into an opening in the upper end of the upright bar 6a and serves to engage the grease opening in an alemite or other fitting used at the ends of frame members of many motor vehicles. This gives quite an accurate place to test from and also serves to support the checking apparatus very rigidly. The use of this apparatus is shown quite clearly in Fig. 13.

Figure 13:
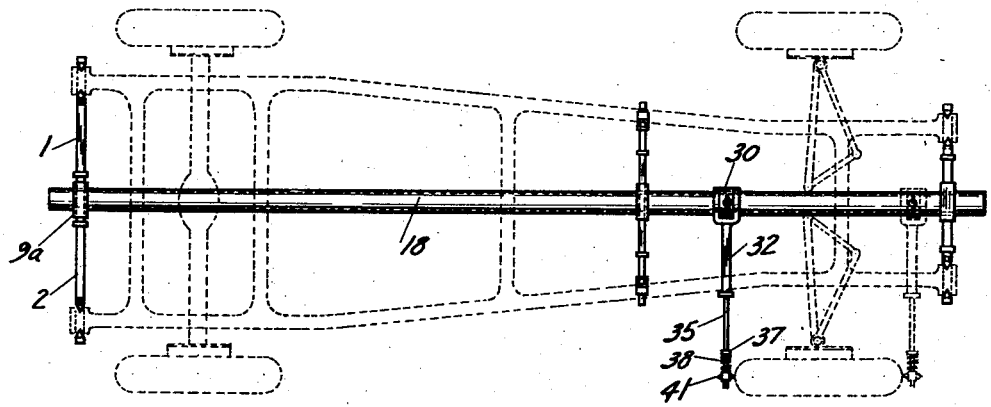
Fig. 13 is a plan view illustrating both frame checking and toe-in checking.
Figures 14, 15:
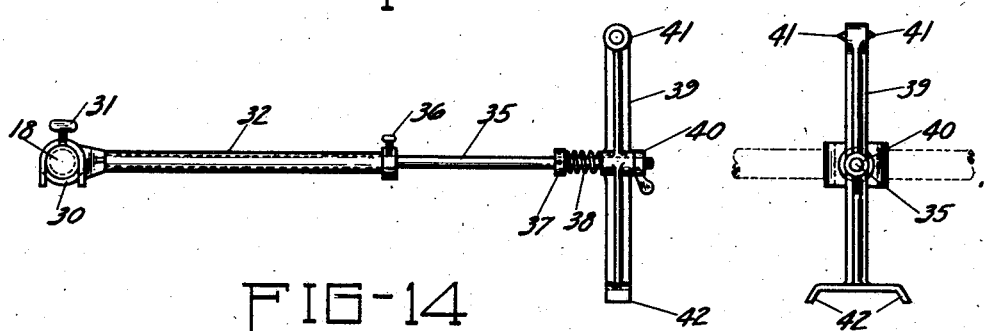
Fig. 14 is an elevation in one direction and Fig. 15 an elevation at a right angle thereto, these two figures showing more in detail a part of the apparatus used in toe-in checking.
Figure 16:
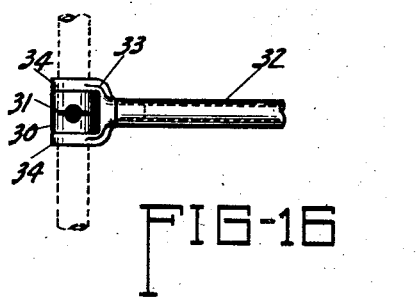
Fig. 16 is a fragmentary plan view of the left hand portion of Fig. 14.

In Figs. 14, 15 and 16 there is shown apparatus for checking the toe-in of wheels and in Fig. 13 is shown the use thereof. This comprises the apparatus described in connection with sheet 3 of the drawings and other apparatus to be now described. A collar 30 is slidable on the pipe 18 and is secured in position thereon by means of a thumb screw 31, which holds it in any desired adjusted position. An arm 32, having a forked and hooked head 33, may be supported at one end on the pipe 18 by having the hooks 34 hooked over the pipe 18 on opposite sides of the collar 30. These hooks or arms fit closely against opposite ends of the sleeve 30 but engage the same loosely enough so that there is no difficulty in turning the arm about the pipe. This arm has an extension 35 which is adjustable with relation thereto and is held in adjusted position by means of the thumb screw 36. Near its outer end the extension 35 has a collar 37 which serves as an abutment for the spring 38, located between the collar and the support 39. Near its mid-point, the support 39 has a sleeve through which the rod 35 passes, the latter being screw-threaded at its outer end and having a nut thereon by means of which the position of the support 39 on the rod 35 may be adjusted. By turning the nut 40 on the rod 35, the spring 38 may be compressed, thus forcing the support 39 inwardly toward the pipe 18 and decreasing the distance between the pipe and the indicating point 41. At its normally lower end, the support 39 has feet 42 which rest upon the floor or ground for supporting the outer end of the arm. Indicating points 41 are located coaxially on opposite sides of the support 39, as is apparent from Fig. 15.

The use of this device is illustrated in Fig. 13 from which it will be seen that, after the checking device has been suspended from the frame and so located as to determine the center line thereof, the collar 30 is adjusted along the pipe 18 until the indicator point 41 will just touch the tread of the tire when the latter is rotated, with the vehicle jacked up. This indicating point should contact the surface of the tire at approximately the middle of its bearing face. After a line has been scribed on the face of the tire, the marking apparatus is removed from the pipe 18 and the collar 30 is moved to the dotted position at the right end of Fig. 13. The marking apparatus is now placed in position, as shown by dotted lines, and the amount of toe-in of this wheel, at this setting, is indicated by the distance between the indicator point 41 and the line scribed on the tire. A similar procedure for the other wheel will determine the amount of toe-in of this one, also. If there is a slight variation between the indicated toe-in of the two wheels, the average of the amounts will indicate the toe-in for each wheel. The pipe, as illustrated in Fig. 13, is somewhat exaggerated as to size but nevertheless illustrates the principle involved.

While I have disclosed what is now regarded as the preferred embodiment of this invention, I desire this disclosure to be understood as illustrative only and not to be interpreted in a limiting sense.

I claim:

1. In a chassis checking apparatus, a composite bar comprising graduated bars held together in side-by-side relation for relative sliding motion, a slide embracing the graduated bars and carrying a plurality of sighting points defining a line substantially perpendicular to the axis of the composite bar and adapted to be placed in the mid-plane of a vehicle when the slide is adjusted to the mid-point in the length of the composite bar, said composite bar having at its ends means for engaging opposite parts of the sides of the frame of a vehicle.

2. In a chassis checking apparatus, a composite bar comprising graduated bars held together in side-by-side relation for relative sliding motion, a slide embracing the graduated bars and having a V-shaped notch therein for the reception of a rod or pipe for indicating the central plane of a vehicle when the slide is adjusted to the mid-point in the length of the composite bar, and a rod or pipe engaged in said V-shaped notch to be supported from the vehicle in the axial plane thereof, said composite bar having at its ends means for engaging opposite parts of the sides of the frame of the vehicle and support the rod or pipe in said axial plane.

3. In a chassis checking apparatus, a pair of composite bars for determining the mid-plane of the chassis, in combination with a pipe or rod to be suspended from said composite bars, each of said bars comprising a pair of graduated bars connected together to slide longitudinally relatively to each other, upstanding members adjacent the ends of the composite bars and adapted to engage and be supported from the frame of the chassis, a slide on each composite bar to be located mid-way of the length thereof, and means for holding the pipe or bar against said slide and for supporting same in line with the mid-points of said two composite bars.

4. A chassis checking apparatus as defined by claim 3 having a collar slidable along said pipe or bar and securable at any desired point in the length thereof, and a marking unit having a forked end adapted to engage over the pipe or bar and be positioned by said collar, said marking unit having a marking point to engage the tread of a tire and scribe a line thereon when the wheel carrying the tire is rotated.

5. A chassis checking apparatus comprising a plurality of elements to be attached to a vehicle frame and suspended therefrom, said elements each having a slide to be adjusted to the mid-point in the length thereof and one or more of said elements having a cross bar arranged at a right angle thereto and carrying a pair of sighting points spaced lengthwise of the cross bar from each other, and the remaining element or elements having sighting means to cooperate with the first named sighting means.

6. A chassis checking apparatus comprising a pair of checking units to be located one at each end of the chassis and a third unit to be located intermediate the ends thereof, each of said units comprising a pair of marked bars, overlapping and in sliding relation, and a slide encircling the overlapping parts of said bars, said slide being capable of longitudinal adjustment of the bars and of being located mid-way between the extreme ends thereof, said extreme ends having means whereby the bars may be suspended from the chassis with the mid-point of the slide in the mid-plane of the vehicle.

7. A structure as defined by claim 6 in which the checking units at the two ends of the chassis have sight-supporting bars arranged transversely thereof, and a pair of sights on each of said sight-supporting bars, the line of sight in each case being at a right angle to the checking unit.

8. An element of a chassis checking apparatus comprising an arm having a forked and hooked end and at its opposite end an adjustable extension, said extension having adjacent its outer end a support whereby the outer end of the arm and the extension may be supported above the floor or the ground, said support having a marking point projecting therefrom to bear against and scribe a line on the tread of a tire when rotated.

9. Chassis checking apparatus comprising a pair of graduated relatively slidable bars held together in parallel relation to form a composite bar, means to be placed mid-way between the extreme ends of the composite bar to be used in determining the mid-plane of the chassis, and means for attaching the apparatus to the chassis to support the first mentioned means in the mid-plane of the chassis, each of the slidable bars having a loop surrounding the other bar to keep the axes of the bars substantially parallel, the means for attaching the apparatus to the chassis being located adjacent the extremities of the composite bar and serving to engage the side frame members of a vehicle.

10. A structure as defined by claim 9 in which the means adjacent the extreme ends of the composite bar are adjustable transversely of the bar, and the supporting means being graduated to enable the composite bar to be adjusted toward and away from the vehicle and to be adjusted into parallelism with the plane of the vehicle frame.

ROY D. SMITH.